(12) United States Patent
Li

(10) Patent No.: US 9,239,482 B2
(45) Date of Patent: Jan. 19, 2016

(54) BACKLIGHT MODULE AND LIQUID CRYSTAL DISPLAY

(71) Applicant: Shenzhen China Star Optoelectronics Technology Co., Ltd., Shenzhen, Guangdong (CN)

(72) Inventor: Quan Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 92 days.

(21) Appl. No.: 14/116,130

(22) PCT Filed: Oct. 15, 2013

(86) PCT No.: PCT/CN2013/085232
§ 371 (c)(1),
(2) Date: Nov. 7, 2013

(87) PCT Pub. No.: WO2015/051556
PCT Pub. Date: Apr. 16, 2015

(65) Prior Publication Data
US 2015/0103285 A1    Apr. 16, 2015

(30) Foreign Application Priority Data
Oct. 12, 2013 (CN) .......................... 2013 1 0476209

(51) Int. Cl.
*G02F 1/1333* (2006.01)
*F21V 8/00* (2006.01)
*G02F 1/1345* (2006.01)

(52) U.S. Cl.
CPC ........ *G02F 1/133308* (2013.01); *G02B 6/0088* (2013.01); *G02F 1/13452* (2013.01); *G02F 2001/13332* (2013.01); *G02F 2001/133314* (2013.01); *G02F 2001/133317* (2013.01)

(58) Field of Classification Search
CPC .............. G02F 1/133308; G02F 2001/133314; G02F 1/133615; G02F 2001/133328; G02F 2001/133317; G02F 2201/46; G02F 1/1333; G02F 2201/465; G02F 2001/13332; G02F 2001/133322; G02F 1/133608; G02F 1/13452
See application file for complete search history.

(56) References Cited

U.S. PATENT DOCUMENTS

| | | | |
|---|---|---|---|
| 7,088,403 B2 * | 8/2006 | Kim | 349/58 |
| 7,113,237 B2 * | 9/2006 | Nitto et al. | 349/58 |
| 7,528,899 B2 * | 5/2009 | Cho | 349/59 |

(Continued)

FOREIGN PATENT DOCUMENTS

CN          102595845 A       7/2012

*Primary Examiner* — Dung Nguyen
*Assistant Examiner* — Shan Liu
(74) *Attorney, Agent, or Firm* — Andrew C. Cheng

(57) ABSTRACT

A backlight module and a liquid crystal display are disclosed. The backlight module includes a back frame and a support. The back frame is arranged on the support and is fixedly connected with the support. A receiving cavity is formed between the back frame and the support for receiving flexible circuit boards and printed circuit boards connecting to the flexible circuit boards. By adding the support at the outer side of the back frame, the receiving cavity is formed between the back frame and the support to receive the doubled flexible circuit boards and printed circuit boards. Not only the resolution of the liquid crystal display is achieved, but also the reliability of the mechanical components of the liquid crystal display is enhanced.

15 Claims, 3 Drawing Sheets

(56) References Cited

U.S. PATENT DOCUMENTS 8,649,162 B2 * 2/2014 Jang et al. ................ 361/679.02
2010/0201906 A1 * 8/2010 Fukayama et al. .............. 349/58
2013/0027965 A1 * 1/2013 Noh et al. ..................... 362/602
2013/0182412 A1 * 7/2013 Choi et al. ................... 362/97.1

* cited by examiner

BACKLIGHT MODULE AND LIQUID CRYSTAL DISPLAY

BACKGROUND OF THE INVENTION

1. Field of the Invention

The present disclosure relates to liquid crystal display technology, and more particularly to a backlight module and a liquid crystal display (LCD).

2. Discussion of the Related Art

LCDs are characterized by attributes such as thinner, power-saving, low radiation, and the emitted soft lights are not harm to human eyes, and thus are greatly adopted. With the demand toward high resolution display, currently, the LCDs with 4K resolution are very popular as the high display performance. In order to develop the LCDs with higher resolution, the study regarding the LCDs with 8 k resolution is ongoing.

With the developed technology, it can be understood that LCDs with higher resolution is the trend, which results in that the number of flexible circuit boards (FCBs) is also increased. The FCBs are densely arranged on sources of the liquid crystal panel, and thus the mechanical design is affected, such as the screw arrangement.

SUMMARY

In one aspect, a backlight module comprises: a back frame and a support, the back frame is arranged on the support and is fixedly connected with the support, a receiving cavity is formed between the back frame and the support for receiving flexible circuit boards and printed circuit boards connecting to the flexible circuit boards.

Wherein the receiving cavity is formed between a sidewall of the support and the sidewall of the back frame Wherein a portion of a bottom plate of the support that is close to the sidewall of the back frame protrudes along a direction farther from the bottom plate of the back frame to form the receiving cavity.

Wherein a portion of the bottom plate of the support that is far from the sidewall of the back frame attaches the bottom plate of the back frame, and the portion of the bottom plate of the support that is far from the sidewall of the back frame comprises a second through hole, the bottom plate of the back frame comprises a fixing hole corresponding to a location of the second through hole, a fixing member passes through the second through hole and the fixing hole in turn to fix the bottom plate of the support and the bottom plate of the back frame.

Wherein a portion of the boom plate of the support that is far from the sidewall of the back frame further comprises a first through hole, the bottom plate of the back frame comprises a connecting hole corresponding to the location of the first through hole, the second through hole passes through the first through hole, the direction from the second through hole toward the first through hole is vertical to the sidewall of the back frame, and the first through hole is closer to the sidewall of the back frame, a connecting member passes through the first through hole and the connecting hole in turn so as to connect the bottom plate of the support and the bottom plate of the back frame, and the support moves along the direction from the sidewall of the back frame toward the sidewall of the support.

Wherein the connecting member is a stepped screw, a middle portion comprises no thread, and a height of a middle portion of the stepped screw is larger than a thickness of the bottom plate of the support.

Wherein the backlight module further comprises a plastic frame, a sidewall of the plastic frame is arranged within receiving cavity and is fixedly connected with the sidewall of the back frame, and an edge of the sidewall of the plastic frame extends along a direction from the sidewall of the back frame toward the sidewall of the support to form a supporting platform for supporting the flexible circuit boards and the printed circuit boards connecting to the flexible circuit boards.

In another aspect, a liquid crystal display comprises: a backlight module, a liquid crystal panel arranged on the backlight module, and an outer frame, an edge of the outer frame presses the liquid crystal panel on the backlight module, a sidewall of the outer frame is fixedly connected with the sidewall of the support of the backlight module so as to fix the liquid crystal panel and the backlight module, wherein the backlight module comprises a back frame and a support, the back frame is arranged on the support and is fixedly connected with the support, a receiving cavity is formed between the back frame and the support for receiving flexible circuit boards and printed circuit boards connecting to the flexible circuit boards.

Wherein the sidewall of the outer frame is fixedly connected with the sidewall of the support via screws.

Wherein the sidewall of the support comprises a clasp, the sidewall of the outer frame comprises a latch hole corresponding to the location of the clasp, the clasp engages with the latch hole to fixedly connect the sidewall of the outer frame and the sidewall of the support.

By adding the support at the outer side of the back frame, the receiving cavity is formed between the back frame and the support to receive the doubled flexible circuit boards and PCBs. Not only the resolution of the liquid crystal display is achieved, but also the reliability of the mechanical components of the liquid crystal display is enhanced.

DETAILED DESCRIPTION OF THE EMBODIMENTS

Figure 1:
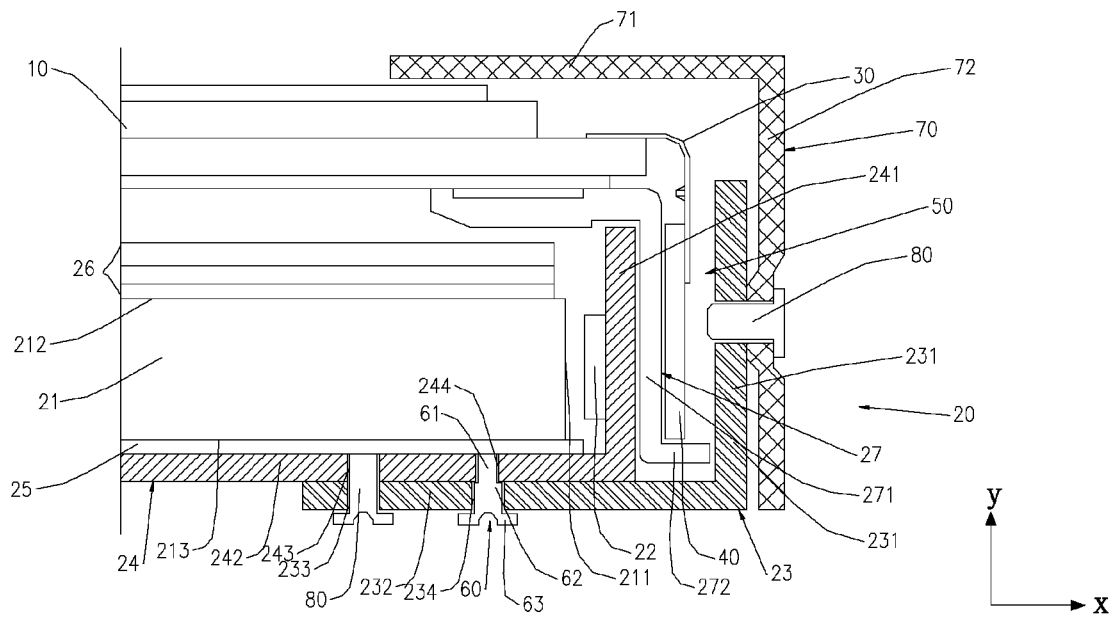
FIG. 1 is a schematic view of the liquid crystal display in accordance with a first embodiment.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

FIG. 1 is a schematic view of the liquid crystal display in accordance with a first embodiment.

The liquid crystal display includes a liquid crystal panel 10 and a backlight module 20. The liquid crystal panel 10 is arranged on the backlight module 20. In other words, the backlight module 20 is arranged opposite to the liquid crystal panel 10. The backlight module 20 provide a display light source to the liquid crystal panel 10 such that the liquid crystal panel 10 is capable of displaying images due to the lights emitted from the backlight module 20. The fixing method of the liquid crystal panel 10 and the backlight module 20 will be described together with the backlight module 20. In one embodiment, the liquid crystal panel 10 is a liquid crystal panel incorporating with current technology and thus the corresponding description is omitted hereinafter.

Referring to FIG. 1, in the first embodiment, the backlight module 20 includes a light guiding plate 21, a back frame 24, a reflective plate 25, an optical film 26, and a plastic frame 27. Specifically, the light guiding plate 21 is arranged within the back frame 24. The light guiding plate 21 includes a light incident surface 211, a light emitting surface 212 connecting to the light incident surface 211, and a bottom surface 213 opposite to the 212. A light source 22 is arranged adjacent to the light incident surface 211 such that the light beams emitted from the light source 22 enter the light guiding plate 21 via the light incident surface 211, and then the light beams emit from the light emitting surface 212 after being uniformly diffused within the light guiding plate 21. The reflective plate 25 is arranged between the bottom surface 213 and the back frame 24 for reflecting the light beams from the bottom surface 213 toward the light guiding plate 21 so as to enhance the light utilization rate. The optical film 26 is arranged on the light emitting surface 212 to enhance the uniformity, brightness, chromaticity, and so on. The plastic frame 27 is assembled with the back frame 24 so as to fix the optical film 26, the light guiding plate 21, and the reflective plate 25 within the back frame 24.

As described, as the liquid crystal display of the claimed invention has high resolution, such as 4 k or even 8 k, the number of the flexible circuit boards (FCBs), such as chip on film (COF) 30, and the printed circuit board (PCB) 40 are doubled. In order to arrange the FCBs 30 and the PCBs 40, the backlight module 20 further includes a support 23. The back frame 24 is fixedly arranged on the support 23 and connects to the support 23. In addition, a sidewall 241 of the back frame 24 and the sidewall 231 of the support 23 defines a receiving cavity 50 therebetween for receiving the FCBs 30 and the PCBs 40.

In order to receive the FCBs 30 and the PCBs 40 within the receiving cavity 50, preferably, the sidewall 271 of the plastic frame 27 is arranged within the receiving cavity 50. The sidewall 271 fixedly connects to the sidewall 241 of the back frame 24. In addition, the edge of the sidewall 271 of the plastic frame 27 extends along a direction from the sidewall 241 of the back frame 24 toward the sidewall 231 of the support 23, i.e., the "x" direction in FIG. 1, to form a supporting platform 272, which is for supporting the FCBs 30 and the PCBs 40 connected to the FCBs 30.

In order to fix the support 23 and the back frame 24, preferably, a second through hole 233 is arranged on a bottom plate 232 of the support 23. A fixing hole 243 is arranged on a bottom plate 242 of the back frame 24 corresponding to a location of the second through hole 233. After aligning the second through hole 233 and the fixing hole 243, a fixing member 80 passes through the second through hole 233 and the fixing hole 243 in turn to fix the bottom plate 232 of the support 23 and the bottom plate 242 of the back frame 24. In order to facilitate the assembling process, preferably, the fixing member 80 is a screw. In other embodiments, the fixing member 80 may be rivot, or bolts together with nuts.

Figure 2:
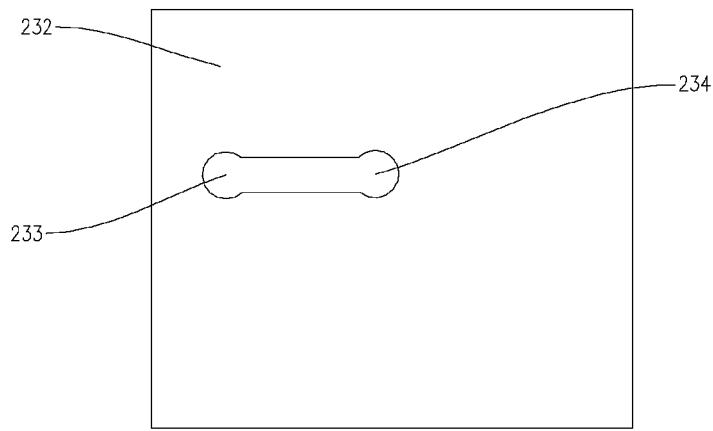
FIG. 2 is a schematic view of the bottom plate of a support in accordance with the first embodiment.

Also referring to FIGS. 1 and 2, a first through hole 234 is arranged on the bottom plate 232 of the support 23 and a connecting hole 244 corresponding to first through hole 234 is arranged on the bottom plate 242 of the back frame 24. With such configuration, the support 23 moves with respect to the back frame 24 such that the FCBs 30 and the PCBs 40 can be easily arranged within the receiving cavity 50. The second through hole 233 passes through the first through hole 234, and the direction from the second through hole 233 toward the first through hole 234, i.e., the x direction in FIG. 1, is vertical to the sidewall 241 of the back frame 24. In addition, the first through hole 234 is closer than the second through hole 233 with respect to the sidewall 241 of the back frame 24. After aligning the first through hole 234 and connecting hole 244, a connecting member 60 passes through the first through hole 234 and the connecting hole 244 in turn so as to flexibly connect the bottom plate 232 of the support 23 and the bottom plate 242 of the back frame 24. As such, the support 23 moves along the direction from the sidewall 241 of the back frame 24 toward the sidewall 231 of the support 23, i.e., the x direction in FIG. 1.

In one embodiment, the connecting member 60 can be stepped screws. A front portion 61 of the stepped screw is arranged with threads and a middle portion 62 has no thread. The height of the front portion 61 of the stepped screw is larger than a thickness of the bottom plate 232 of the support 23. When the stepped screw passes through the first through hole 234 and the connecting hole 244 in turn, the front portion 61 has a threaded connection with the connecting hole 244 with the thread. A dimension of the head portion 63 is larger than that of the first through hole 234. The head portion 63 cooperates with the front portion 61 to connect the bottom plate 232 of the support 23 and the bottom plate 242 of the back frame 24. The height of the front portion 61 is larger than the thickness of the bottom plate 232 of the support 23 such that the bottom plate 232 of the support 23 and the bottom plate 242 of the back frame 24 are not fastened. In this way, the support 23 moves along the x direction with respect to the back frame 24 to leave a space for the PCB 40 to bend along the FCBs 30.

Referring to FIG. 1, in order to fix the liquid crystal panel 10 and the backlight module 20, the liquid crystal display also includes an outer frame 70. An edge 71 of the outer frame 70 presses the liquid crystal panel 10 on the backlight module 20. In addition, the sidewall 72 of the outer frame 70 is fixedly connected with the sidewall 231 of the support 23 of the backlight module 20 via screws. In this way, the liquid crystal panel 10 and the backlight module 20 are assembled to be the liquid crystal display.

By adding the support at the outer side of the back frame, the receiving cavity is formed between the back frame and the support to receive the doubled flexible circuit boards and PCBs. Not only the resolution of the liquid crystal display is achieved, but also the reliability of the mechanical components of the liquid crystal display is enhanced.

Figure 3:
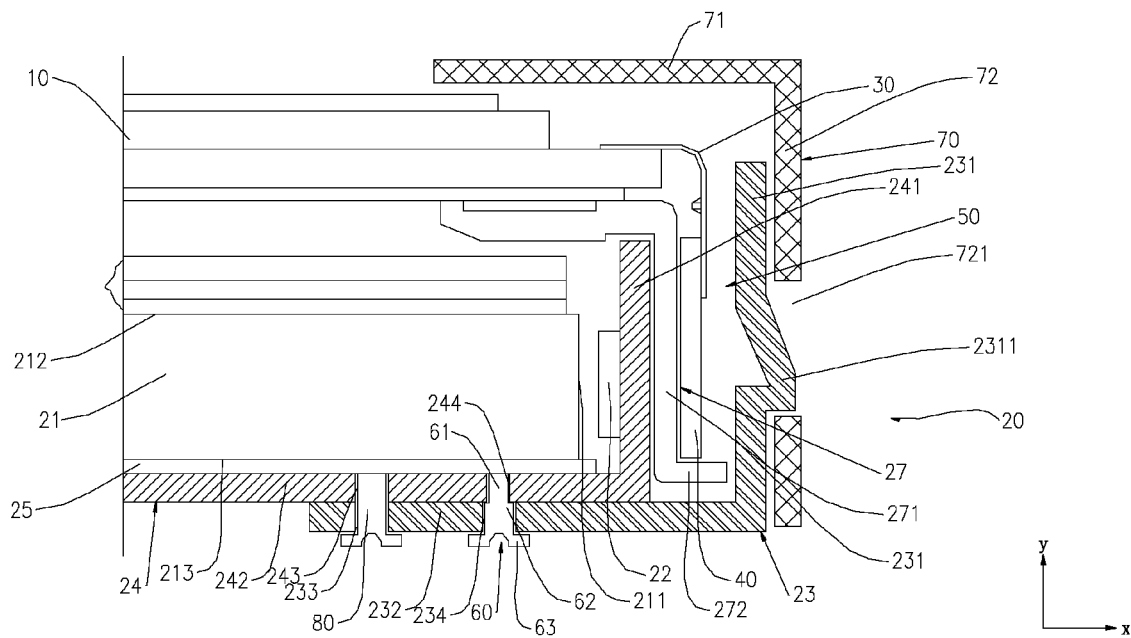
FIG. 3 is a schematic view of the liquid crystal display in accordance with a second embodiment.

The difference between the second embodiment and the first embodiment will be described hereinafter with reference to FIG. 3. FIG. 3 is a schematic view of the liquid crystal display in accordance with the second embodiment.

The difference resides in that the liquid crystal display also includes an outer frame 70 to fix the liquid crystal panel 10 and the backlight module 20. An edge 71 of the outer frame 70 presses the liquid crystal panel 10 on the backlight module 20. The outer frame 70 includes a latch hole 721 arranged on the sidewall 72. The sidewall 231 of the support 23 includes a clasp 2311 corresponding to the location of the latch hole 721. The clasp 2311 engages with the latch hole 721 to fixedly connect the sidewall 72 of the outer frame 70 and the sidewall 231 of the support 23. As such, the liquid crystal panel 10 and the backlight module 20 are assembled to be the liquid crystal display.

Figure 4:
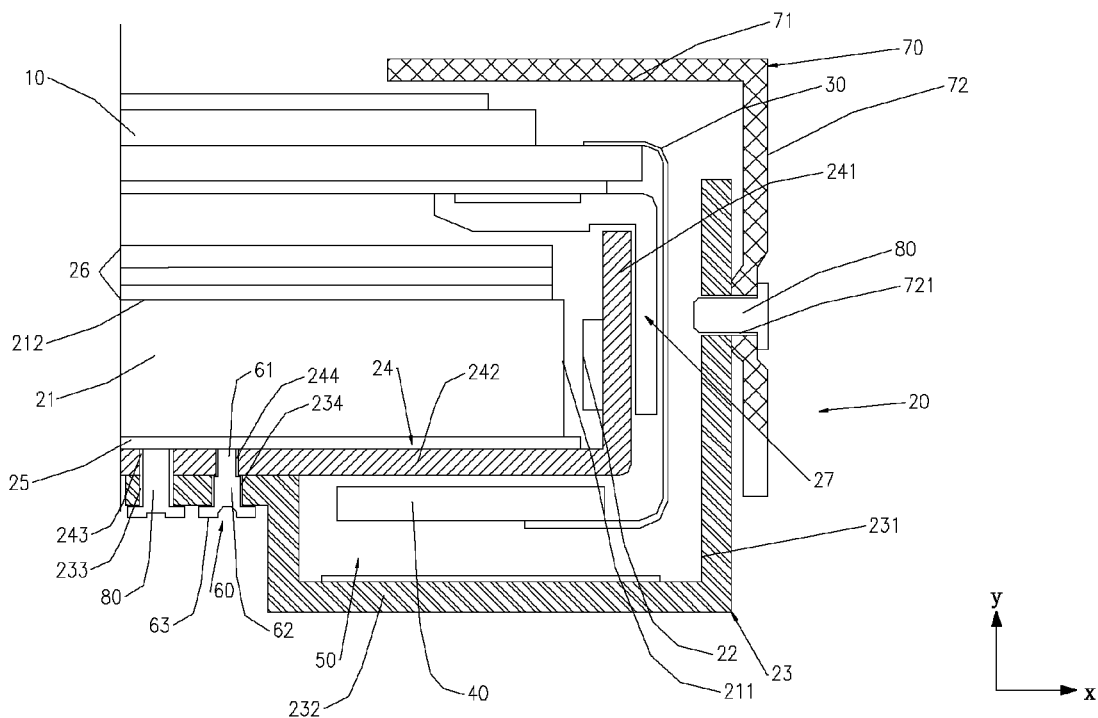
FIG. 4 is a schematic view of the liquid crystal display in accordance with a third embodiment.

FIG. 4 is a schematic view of the liquid crystal display in accordance with a third embodiment. The difference between the third embodiment and the first embodiment resides is described hereinafter. The backlight module 20 further includes the support 23 so as to receive the doubled FCBs 30 and the PCBs 40 connecting to the FCBs 30. The back frame 24 is arranged on the support 23 and the back frame 24 is fixedly connected with the support 23. In addition, a portion of the bottom plate 232 of the support 23, which is close to the sidewall 241 of the back frame 24, protrudes along a direction farther from bottom plate 242, i.e., the direction opposite to the "y" direction in FIG. 4, to form the receiving cavity 50 for receiving the doubled FCBs 30 and the PCBs 40.

In addition, as the receiving cavity 50 is formed between the bottom plate 242 of the back frame 24 and the bottom plate 232 of the support 23, in order to facility the assembly, the edge portion of the sidewall 271 of the plastic frame 27 includes the supporting platform 272 shown in FIG. 1.

Figure 5:
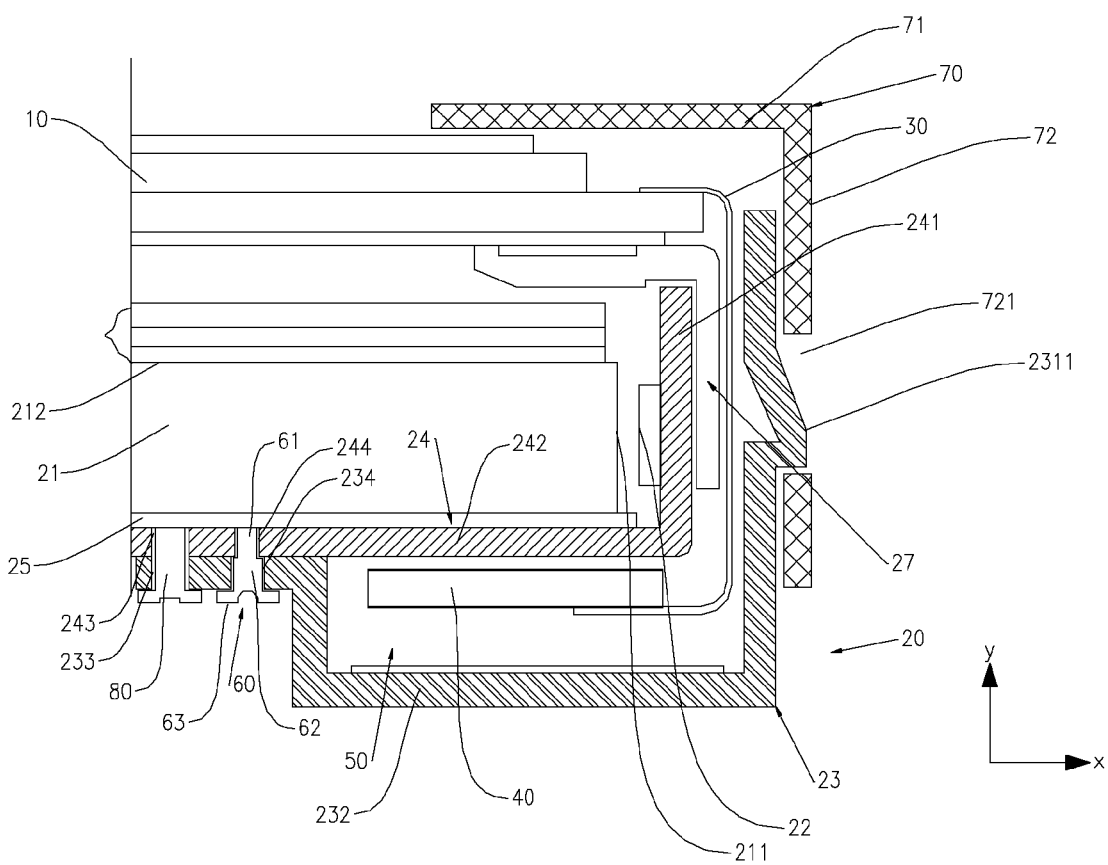
FIG. 5 is a schematic view of the liquid crystal display in accordance with a fourth embodiment.

FIG. 5 is a schematic view of the liquid crystal display in accordance with a fourth embodiment. The difference between the fourth embodiment and the first embodiment is described hereinafter. The backlight module 20 further includes the support 23 to receive the doubled FCBs 30 and the PCBs 40 connecting to the FCBs 30. The back frame 24 is arranged on the support 23 and the back frame 24 is fixedly connected with the support 23. In addition, a portion of the bottom plate 232 of the support 23, which is close to the sidewall 241 of the back frame 24, protrudes along a direction farther from bottom plate 242, i.e., the direction opposite to the "y" direction in FIG. 5, to form the receiving cavity 50 for receiving the doubled FCBs 30 and the PCBs 40.

In addition, as the receiving cavity 50 is formed between the bottom plate 242 of the back frame 24 and the bottom plate 232 of the support 23, in order to facility the assembly, the edge portion of the sidewall 271 of the plastic frame 27 includes the supporting platform 272 shown in FIG. 1.

The liquid crystal display also includes the outer frame 70 to fix the liquid crystal panel 10 and the backlight module 20. The edge 71 of the outer frame 70 presses the liquid crystal panel 10 on the backlight module 20. The outer frame 70 includes the latch hole 721 arranged on the sidewall 72. The sidewall 231 of the support 23 includes the clasp 2311 corresponding to the location of the latch hole 721. The clasp 2311 engages with the latch hole 721 to fixedly connect the sidewall 72 of the outer frame 70 and the sidewall 231 of the support 23. As such, the liquid crystal panel 10 and the backlight module 20 are assembled to be the liquid crystal display.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
  a back frame and a support, the back frame is arranged on the support and is fixedly connected with the support, and a receiving cavity is formed between the back frame and the support for receiving flexible circuit boards and printed circuit boards connecting to the flexible circuit boards;
  a portion of a bottom plate of the support comprises a first through hole and a second through hole, and a bottom plate of the back frame comprises a connecting hole corresponding to a location of the first through hole;
  wherein the portion of the bottom plate of the support that is far from a sidewall of the back frame attaches the bottom plate of the back frame, and the portion of the bottom plate of the support that is far from the sidewall of the back frame comprises the second through hole, the bottom plate of the back frame comprises a fixing hole corresponding to a location of the second through hole a fixing member passes through the second hole and the fixing hole in turn to fix the bottom plate of the support and the bottom plate of the back frame; and
  wherein the portion of the bottom plate of the support that is far from the sidewall of the back frame comprises the first through hole, the second through hole passes through the first through hole, a direction from the second through hole toward the first through hole is vertical to the sidewall of the back frame, and the first through hole is closer to the sidewall of the back frame a connecting member passes through the first through hole and the connecting hole in turn so as to connect the bottom plate of the support and the bottom plate of the back frame, and the support moves along a direction from the sidewall of the back frame toward a sidewall of the support.

2. The backlight module as claimed in claim 1, wherein the receiving cavity is formed between the sidewall of the support and the sidewall of the back frame.

3. The backlight module as claimed in claim 2, wherein the backlight module further comprises a plastic frame, a sidewall of the plastic frame is arranged within, and an edge of the sidewall of the plastic frame extends along a direction from the sidewall of the back frame toward the sidewall of the support to form a supporting platform for supporting the flexible circuit boards and the printed circuit boards connecting to the flexible circuit boards.

4. The backlight module as claimed in claim 1, wherein a portion of the bottom plate of the support that is close to the sidewall of the back frame protrudes along a direction farther from the bottom plate of the back frame to form the receiving cavity.

5. The backlight module as claimed in claim 1, wherein the connecting member is a stepped screw, a middle portion comprises no thread, and a height of a middle portion of the stepped screw is larger than a thickness of the bottom plate of the support.

6. A liquid crystal display, comprising:
  a backlight module, a liquid crystal panel arranged on the backlight module, and an outer frame, an edge of the outer frame presses the liquid crystal panel on the backlight module, a sidewall of the outer frame is fixedly connected with a sidewall of a support of the backlight module so as to fix the liquid crystal panel and the backlight module, wherein the backlight module comprises a back frame and the support, the back frame is arranged on the support and is fixedly connected with the support, a receiving cavity is formed between the back frame and the support for receiving flexible circuit boards and printed circuit boards connecting to the flexible circuit boards;
  a portion of a bottom plate of the support comprises a first through hole and a second through hole, and a bottom plate of the back frame comprises a connecting hole corresponding to a location of the first through hole;

wherein the portion of the bottom plate of the support that is far from a sidewall of the back frame attaches the bottom plate of the back frame, and the portion of the bottom plate of the support that is far from the sidewall of the back frame comprises the second through hole, the bottom plate of the back frame comprises a fixing hole corresponding to a location of the second through hole, a fixing member passes through the second through hole and the fixing hole in turn to fix the bottom plate of the support and the bottom plate of the back frame; and wherein the portion of the bottom plate of the support that is far from the sidewall of the back frame comprises the first through hole, the second through hole passes through the first through hole, a direction from the second through hole toward the first through hole is vertical to the sidewall of the back frame, and the first through hole is closer to the sidewall of the back frame a connecting member sasses through the first through hole and the connecting hole in turn so as to connect the bottom plate of the support and the bottom plate of the back frame, and the support moves along a direction from the sidewall of the back frame toward a sidewall of the support.

7. The liquid crystal display as claimed in claim 6, wherein the receiving cavity is formed between the sidewall of the support and the sidewall of the back frame.

8. The liquid crystal display as claimed in claim 7, wherein the backlight module further comprises a plastic frame, a sidewall of the plastic frame is arranged within the receiving cavity, and an edge of the sidewall of the plastic frame extends along a direction from the sidewall of the back frame toward the sidewall of the support to form a supporting platform for supporting the flexible circuit boards and the printed circuit boards connecting to the flexible circuit boards.

9. The liquid crystal display as claimed in claim 6, wherein a portion of the bottom plate of the support that is close to the sidewall of the back frame protrudes along a direction farther from the bottom plate of the back frame to form the receiving cavity.

10. The liquid crystal display as claimed in claim 6, wherein the connecting member is a stepped screw, a middle portion comprises no thread, and a height of a middle portion of the stepped screw is larger than a thickness of the bottom plate of the support.

11. The liquid crystal display as claimed in claim 6, wherein the sidewall of the outer frame is fixedly connected with the sidewall of the support via screws.

12. The liquid crystal display as claimed in claim 6, wherein the sidewall of the support comprises a clasp, the sidewall of the outer frame comprises a latch hole corresponding to the location of the clasp, the clasp engages with the latch hole to fixedly connect the sidewall of the outer frame and the sidewall of the support.

13. A backlight module, comprising:

a back frame and a support, the back frame is arranged on the support and is fixedly connected with the support, and a receiving cavity is formed between the back frame and the support for receiving flexible circuit boards and printed circuit boards connecting to the flexible circuit boards;

wherein the receiving cavity is formed between a sidewall of the support and a sidewall of the back frame;

wherein a portion of a bottom plate of the support that is close to the sidewall of the back frame protrudes along a direction farther from a bottom plate of the back frame to form the receiving cavity.

wherein a portion of the bottom plate of the support that is far from the sidewall of the back frame attaches the bottom plate of the back frame, and the portion of the bottom plate of the support that is far from the sidewall of the back frame comprises a second through hole, the bottom plate of the back frame comprises a fixing hole corresponding to a location of the second through hole, a fixing member passes through the second through hole and the fixing hole in turn to fix the bottom plate of the support and the bottom plate of the back frame; and wherein the portion of the bottom plate of the support that is far from the sidewall of the back frame further comprises a first through hole, the bottom plate of the back frame comprises a connecting hole corresponding to the location of the first through hole, the second through hole passes through the first through hole, a direction from the second through hole toward the first through hole is vertical to the sidewall of the back frame, and the first through hole is closer to the sidewall of the back frame, a connecting member passes through the first through hole and the connecting hole in turn so as to connect the bottom plate of the support and the bottom plate of the back frame, and the support moves along a direction from the sidewall of the back frame toward the sidewall of the support.

14. The backlight module as claimed in claim 13, wherein the connecting member is a stepped screw, a middle portion comprises no thread, and a height of a middle portion of the stepped screw is larger than a thickness of the bottom plate of the support.

15. The backlight module as claimed in claim 13, wherein the backlight module further comprises a plastic frame, a sidewall of the plastic frame is arranged within the receiving cavity, and an edge of the sidewall of the plastic frame extends along a direction from the sidewall of the back frame toward the sidewall of the support to form a supporting platform for supporting the flexible circuit boards and the printed circuit boards connecting to the flexible circuit boards.

\* \* \* \* \*